United States Patent Office 3,413,535
Patented Nov. 26, 1968

3,413,535
ELECTRIC MOTOR CONTROL UTILIZING ZENER DIODE AND INTEGRATING MEANS IN A LOSS OF LOAD PROTECTION SYSTEM
Lawrence M. Hubby, Bellaire, Tex., assignor to Texaco Inc., New York, N.Y., a corporation of Delaware
Filed Oct. 15, 1965, Ser. No. 496,406
5 Claims. (Cl. 318—447)

ABSTRACT OF THE DISCLOSURE

An electric motor control circuit for shutting down the motor under certain abnormal load conditions. The motor drives a beam type deep well pump or the like having a cyclic load variation between an average maximum and an average minimum amplitude, under normal load conditions. By integrating the load above the minimum and using a desired time constant, a switch is controlled to shut down the motor after a given number of cycles that fail to exceed the minimum.

---

This invention concerns an electric motor control system in general, and more specifically relates to a control system for an electric motor that is subjected to a cyclic load which varies between a predetermined average maximum and minimum.

While there may be various other applications for a motor control system in accordance with this invention, it is particularly adapted for use in oil well pumping wherein a reciprocating type pump is employed so that the load on the motor varies cyclically from a maximum to substantially zero (or somewhat into a generating condition) as a so-called beam-type pump is actuated.

Heretofore, various arrangements have been proposed for shutting down an electric motor when the pumping system to which it is connected runs dry, e.g., my prior U.S. Patent No. 2,947,931, issued Aug. 2, 1960. However these systems have operated upon the change in average load on the motor reflecting the load from the pump, and have failed to take into account the type of load encountered in beam-type pumping systems that are particularly common in oil well pumping arrangements. Thus, the difference between load conditions when fluid is available as contrasted to the situation when the well has pumped off, is not particularly great. This is especially true when conditions over the total pumping cycle are considered.

Because of the nature of the operation of a beam-type pumping system, wherein each stroke of the reciprocating pump arrangement is relatively slow-acting or long in time duration; the load varies during each stroke from about zero to a predetermined maximum both on the up and on the down strokes during normal pumping operations. Even though the beam pumping structure is counter-balanced, the load on the electric motor varies as the beam rocks and reciprocates the pump through each pumping stroke. As the pump reaches either the top or the bottom of the strokes the reciprocating parts change direction and the load on the motor is a minimum.

Thus, it has been observed that under pumped off conditions the only change from normal is during one quarter of a total pumping cycle or one-half of the return stroke of the beam pump. Consequently, in prior systems the attempts to provide sufficient sensitivity have not been particularly successful and a pumped off condition was not rapidly or reliably detected. One reason may have been the difficulties in distinguishing the difference between normal and pumped off conditions. This difficulty is at least in part on account of the time duration of a complete cycle which is on the order of magnitude of about five full seconds.

Consequently, it is an object of this invention to provide an electric motor control system that is applicable to a beam-type reciprocating vertical stroke pumping arrangement, or the like, such that the motor is subjected to a cyclic load varying between a predetermined average maximum and minimum. The arrangement includes provision for determining the load variation only above a predetermined amplitude level so that the absence of a maximum load swing, is readily apparent.

Another object of the invention is to provide an improved electric motor control system for de-energizing the motor. This applies to a system that subjects the motor to a cyclic load varying between a predetermined average maximum and minimum, and operates in situations where the cyclic variation to maximum fails to exceed a predetermined lower amplitude level.

Still another object of the invention is to provide an electric motor control system applicable to control the motor of a reciprocating type pump system. Particularly, it is applicable to a beam-type oil well pumping system where the system encounters a loss of load on the pump during one of the two strokes thereof. In such a system the load on the electric motor remains substantially the same except for about one-half of one of the two strokes involved and, consequently, it has been found difficult to detect the load change and shut down the motor when it occurs.

Briefly, the invention concerns an electric motor control system wherein said motor is subject to a cyclic load varying between a predetermined average maximum and minimum. The system comprises an electric circuit means for measuring the amplitude of said load on said motor, and means responsive to said circuit means for integrating said amplitude measurement above a predetermined level of amplitude. In addition, the system comprises means controlled by said integrating means for shutting off said motor whenever the load fails to rise above said predetermined level of amplitude.

Again, briefly, the invention is applicable to a system including a reciprocating type pumping unit for pumping fluid from a well. It relates to an electric motor control system that comprises an alternating current motor, and circuit means for connecting said motor to a source of alternating electric current supply including a switch. The system also comprises means for measuring the amplitude of current drawn by said motor, and means for integrating said measured amplitude only if it exceeds a predetermined level. The said integrating means includes a rectifier. The system also comprises a direct current relay, first circuit means for connecting said relay output to control such switch, and second circuit means for connecting said integrating means to the relay input. All of the foregoing elements are provided so that a loss of load on a predetermined small number of strokes of said pumping unit will cause said relay to be actuated so as to open said switch and disconnect the motor from said source.

The foregoing and other objects and benefits of the invention will be more fully set forth below in connection with the best modes contemplated by the inventor of carrying out the invention, and in connection with which there are illustrations provided in the drawings wherein.

Figure 1:
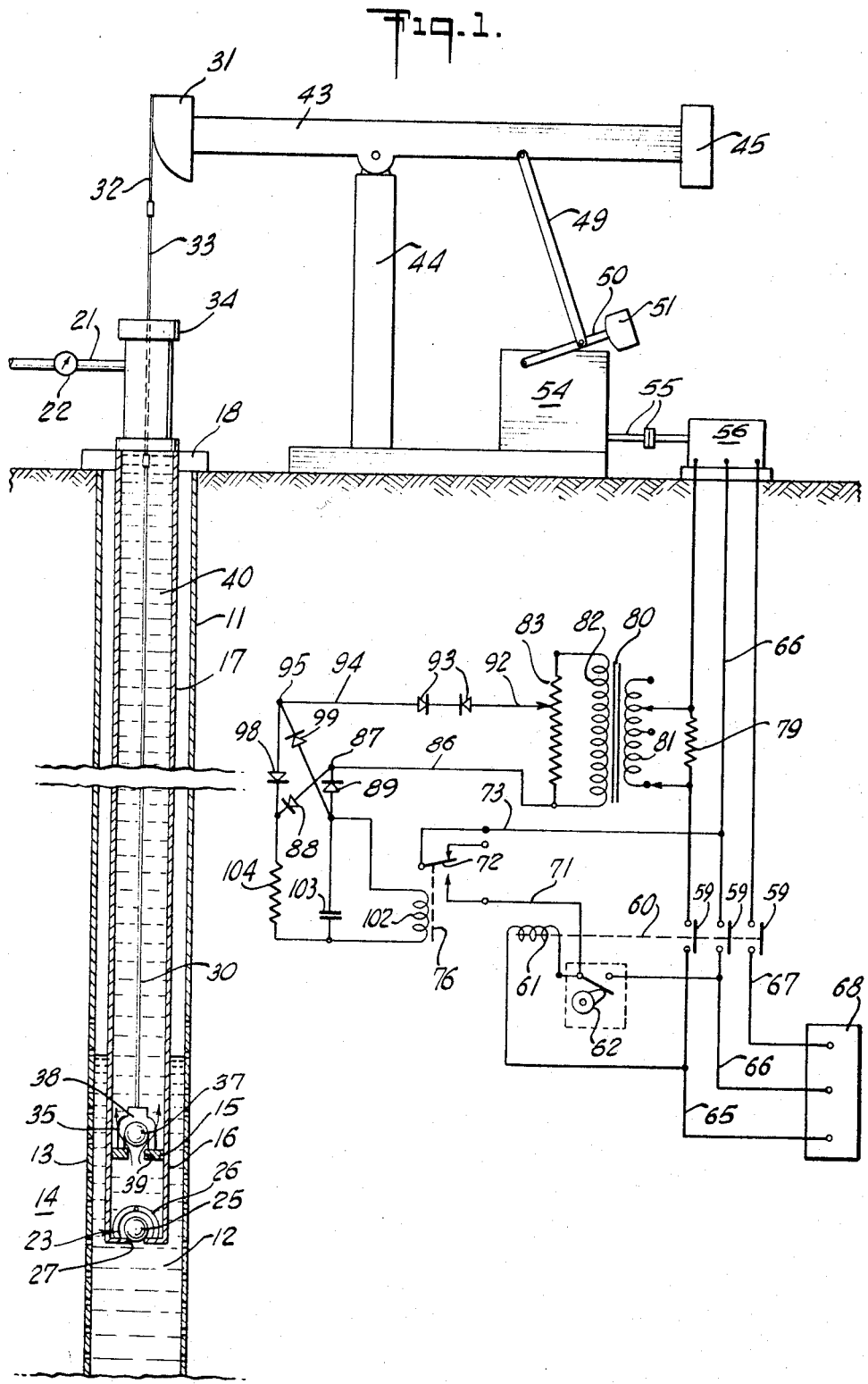
FIGURE 1 is a schematic layout showing the entire system including the electrical circuitry, for a preferred embodiment of the invention.

FIGURE 1 illustrates a preferred embodiment of the invention wherein an electric motor control system is employed with a motor that is connected mechanically to drive a beam-type deep well pumping unit. Of course, there may be other types of mechanical load for an electric motor, having similar characteristics as the illustrated beam pumping arrangement. However, the illustrated application of a motor control system is one of particular concern and for which the system according to this invention was developed.

A typical beam-type pumping unit is schematically illustrated in FIGURE 1 in connection with a well that is being pumped to withdraw oil, or a mixture of oil and water therefrom. As shown, there is a cased well 11 that is perforated or has a screen 13 downhole, in order to admit well fluid 12 from a surrounding formation 14 to the interior of the well 11. From there, it is pumped to the surface by means of a reciprocating pump schematically illustrated.

The pump includes the following basic elements that are illustrated. There is a plunger or piston 15 that moves in a vertical reciprocating manner within a cylindrical barrel 16. The barrel is carried at the lower end of a string of tubing 17 which extends to the surface where it connects to a well head 18. There are internal fluid connections (not shown) with a fluid delivery pipe 21, which may have a flow meter 22 connected therein, if desired.

The lower end of the barrel 16 has a check-valve 23 including elements such as the schematically illustrated structure with a ball 25 and a yoke 26 for maintaining the ball in operative proximity to a port 27. The port 27 admits the fluid 12 from the well into the interior of the barrel 16 during each upstroke of the piston or plunger 15.

It will be observed that the plunger 15 is attached to the lower end of a rod 30. In actual practice, this rod 30 is made up of a string of so-called sucker rods (not shown) which connect the vertically moving piston or plunger of the pump with a horsehead 31 by means of a flexible cable 32 and a polished rod section 33. The polished rod passes through a stuffing-box 34 which is carried by the well head structure 18.

There is a traveling valve 35 on plunger 15. This too is schematically shown, and it includes a ball 37 carried under a yoke 38 to which the rod 30 is attached. There is also a port 39 located in the piston 15, with which port the ball 37 cooperates to provide the desired check-valve action as required.

It will be appreciated that the action of the pump is conventional for a reciprocating lift type pump. When the plunger 15 is moved vertically upward within the barrel 16, it will lift a column of fluid 40 thereabove that is within the tubing string 17. This is, of course, by reason of the fact that the traveling check-valve 35 will be closed during such upstroke. Thus, some of the fluid 40 will be forced out through the pipe 21. At the same time some of the well fluid 12 will flow into the barrel 16 through the standing valve 23 to fill the space beneath the piston 15. Thereafter, during the downstroke of the plunger 15, the fluid which has flowed into the barrel 16 will force open the traveling valve 35 by lifting the ball 37 so that fluid may thus flow through port 39 and join the fluid in column 40. The latter fluid flow action is insured by reason of the standing valve 23.

If the well becomes "pumped-off," then there will be insufficient fluid in the well to flow through the port 27 and fill the barrel 16. Under such circumstances it will be noted that the upstroke remains substantially normal, in that the column of fluid 40 will be lifted as before. However, the downward movement will involve a substantially reduced load on the pumping system, because under such circumstances there will be no fluid beneath the piston 15 to create resistance to its downward movement in the barrel 16. Thus, the weight of the fluid column 40 will merely ride downward with the plunger and cause a reduced load during the downward stroke. This is illustrated and will be described more fully below in connection with other figures of the drawings.

A balanced beam structure for actuating the pump elements described above, is also schematically shown. It includes a rocker arm 43 that supports the horsehead 31 at the end thereof. The arm is pivotally supported from the top of a supporting post 44. There is a counterweight 45 at the other end of the beam, or arm 43, and the arm is rocked about the pivot by means of a connecting rod 49 which is pivotally connected to the arm 43 and a crank arm 50 which has another counterweight 51 at the free end thereof. The crank arm 50 is driven in rotation by the output of a gear box 54, the input of which is in turn driven by a shaft and coupling 55. The latter makes connection to an electric motor 56.

The control system for motor 56 is shown by a schematic electrical diagram, which includes a switch 60. The switch 60 includes three make-and-break contacts 59 and a solenoid 61. It may be a conventional type motor start switch, and it includes as auxiliary equipment a periodically controllable switch 62 that determines the closing of an energizing circuit for the solenoid 61. Such energizing circuit is across two of the three power supply wires 65 and 66. Motor 56 is preferably a three phase type so that the supply includes the wires 65 and 66 together with a third wire 67. These connect the motor 56 with a source of electrical power supply 68.

It will be observed that there is a holding circuit for solenoid 61. This includes a circuit connection 71, one of the contacts of a switch 72 and another circuit connection 73 which leads to the power supply wire 66 between contact 59 and the motor 56. In this manner the motor 56 will be maintained connected to the power supply, following its start-up period, so long as the load on the motor remains normal. That is, so long as there is not a pumped-off condition in the well that is being pumped. This is because of a relay 76 that incorporates the contacts of the switch 72. The relay is actuated under predetermined conditions as will be explained in greater detail below.

The control circuit for relay 76 includes an impedance, such as a resistor 79, that is located in series in one of the three power supply wires, e.g., the wire 65. It will be noted that this impedance is located between the contact 59 of switch 60 and the motor 56. This resistor 79 will create a voltage drop thereacross that is in direct proportion to the total current being drawn by the motor 56.

There is a voltage step-up transformer 80 that has a primary winding 81 connected across the resistor 79. A secondary winding 82 of the transformer 80 has a potentiometer 83 connected thereacross. A circuit connection or wire 86 is connected from the fixed end of the potentiometer 83 to a common circuit point 87. Point 87 is also connected to one side of each of two rectifiers 88 and 89 but in opposite polarity.

Connected to the other side of the potentiometer 83, i.e., from a sliding contactor 92, there is a pair of oppositely connected Zener diodes 93. Such diodes have known characteristics such that an oppositely connected pair will only pass signals, i.e., allow AC current to flow, when the voltage exceeds a predetermined level or amplitude. From the other side of the pair of diodes 93 there is a circuit connection 94 that leads to another common circuit point 95. There is another pair of rectifiers 98 and 99 that are connected in opposite polarities to the common point 95, in a similar manner as was the case with rectifiers 88 and 89 from common point 87. The arrangement of the four rectifiers 88, 89, 98 and 99 is such as to provide full wave rectification for supplying direct current to a winding 102 of the relay 76.

There is an integration circuit in connection with winding 102 of the relay 76, to smooth out the pulsating DC current and especially to provide sufficient time lag to hold the relay 76 actuated between the peaks of recurrent power cycles to which motor 56 is subjected. As mentioned above, only those portions of the AC signals are transmitted that exceed a predetermined given amplitude. This being determined by the diodes 93. This integration circuit includes a capacitor 103 connected across the winding 102, and a resistor 104 connected in series with the winding 102.

*Operation*

Figure 2:
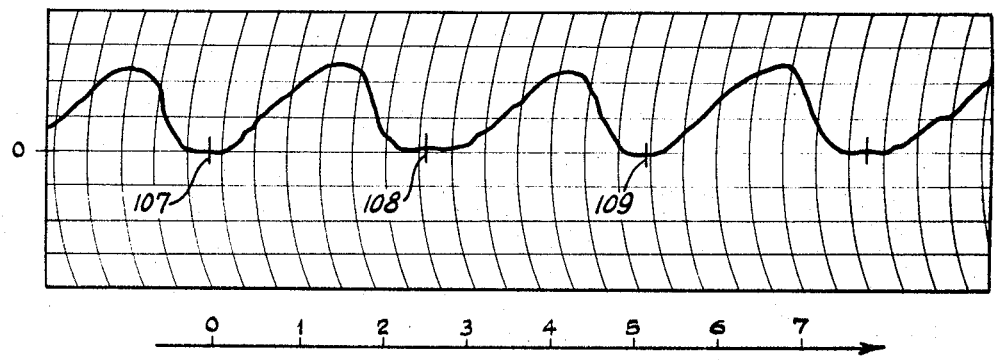
FIGURE 2 is a diagram illustrating a typical record of instantaneous power requirements of an electric motor driving a beam pumping unit.
Figure 3:
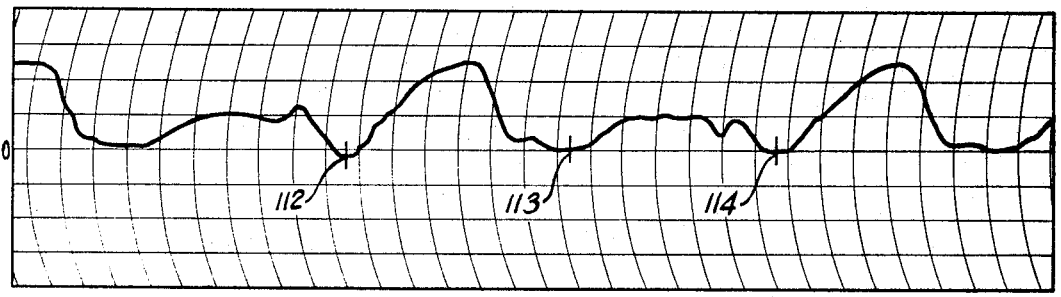
FIGURE 3 is a diagram simiar to that shown in FIGURE 2, but under conditions where the well being pumped has become "pumped-off"

The operation of the system that is illustrated in FIGURE 1 may be understood best with additional reference to FIGURES 2 and 3. These show a pair of charts illustrating the instantaneous power requirements of a motor, such as the motor 56 of FIGURE 1, FIGURE 2 shows power conditions when the well is pumping normally, and FIGURE 3 shows the same thing when the well is pumped-off.

More specifically, it is pointed out that FIGURE 2 shows instantaneous power requirements for a motor on a typical beam pumping unit. Commencing at a point 107 on the graph, the power being drawn is substantially zero. This represents the beginning of an upstroke. It will be appreciated that the up and down strokes here described, refer to the movements of the plunger 15 and the string of sucker rods 30 connected thereto. Of course the plunger acts within the barrel 16 of the pump.

During the upstroke, the power rises to a maximum and then falls back again to substantially zero when the top of the upstroke is reached. This point (top of upstroke) is indicated by a mark or point 108 on the FIGURE 2 chart. It will be appreciated that the power is substantially zero at the beginning and end of the upstroke because of the physical arrangement or mechanics, which includes counter-balancing such that the weight of the sucker rod string 30 and plunger 15 and related pump elements is balanced by the counter-weight 45. In addition there are other counter-balance effects also such as those provided by the other mechanical counter-balancing elements, e.g. the weight 51 on the crank arm 50. During the upstroke, the counter-weight 51 is moving downward and furnishes about half of the work required to lift fluid column 40 within tubing 17, thus reducing the peak load on the motor.

During the downstroke there is a similar, and substantially equal rise in load from about zero to a maximum and back to about zero again. This is shown by the part of the FIGURE 2 chart between the point 108 and a point 109 which represents the end of the downstroke. It will be appreciated that the work being done which creates the increase in load during the downstroke is that of lifting the counter-weight 51. During normal pumping when the pump barrel 16 fills with fluid during the upstroke, the weight of the fluid column 40 is supported by check valve 23 during the downstroke since traveling valve 35 is open. This makes it necessary for the motor to lift counter-weight 51 without the balancing effect of the fluid column. The work stored in lifting the counter-weight during the downstroke is used during the next upstroke to help life the fluid column, as explained above. It may be observed that in a typical pumping unit operation, such as that from which the chart of FIGURE 2 was obtained, the time for a complete cycle is somewhat over five seconds. Thus, slightly more than two and one-half seconds is the time required for an upstroke, or for a downstroke to be completed.

In FIGURE 3, the chart shows instantaneous power requirements for the same motor as that related to the FIGURE 2 chart, but under pumped-off conditions. Thus, in FIGURE 3 an upstroke begins at a point 112. Incidentally, it may be observed that there has been a small amount of override so that the power requirements have fallen below zero, i.e., the motor has been driven to generate somewhat at that point.

The graph shows how, as the stroke continues, there is a power increase to a maximum and back to zero substantially the same way and with substantially the same maximum required as when the well was pumping normally. The end of the upstroke is indicated by a mark 113 on the FIGURE 3 chart. Continuing along the curve, the chart shows power requirements during the downstroke under pumped-off conditions, i.e., between point 113 and a succeeding point 114.

It will be observed that during the downstroke under pumped-off conditions the power requirements rise to a maximum which is less than half that required under normal pumping conditions. The explanation for this is that under pumped-off conditions, there is no fluid in barrel 16 to support the weight of fluid column 40 and the weight of fluid column 40 balances counter-weight 51, thus relieving the motor of the need to lift counter-weight 51 and reducing its power requirement during the downstroke. Actually, as shown on the chart of FIGURE 3 there may be some unbalanced force in the direction of the downward movement. This is caused by the weight of the column of fluid 40, and thus there may be some override near the bottom of the downstroke causing the motor 56 to be overdriven and to generate some power. The latter is indicated on the chart where the curve goes below zero.

From the foregoing, it will be noted that the overage power that exceeds a predetermined amplitude level (as determined by the Zener diodes 93), will change by about fifty percent when the well is pumped-off relative to normal pumping conditions. This change will be reflected in the energizing circuit for the relay 76, and consequently the holding circuit for the solenoid 61 will be opened so that the motor 56 will be de-energized.

Referring to FIGURE 1, the operation of the system may be described commencing with a start-up for the motor 56 and continuing through a complete pumping cycle of the beam pump unit. First, the switch 62 will be closed causing switch 60 to close because of the energization of solenoid 61. Solenoid 61 will be energized because it is connected between wires 66 and 65 of the electrical supply under these conditions. After sufficient starting period so that the motor 56 is drawing normal current, and also so that the load has become sufficient to provide signals in excess of the predetermined amplitude level as determined by the characteristics of the Zener diodes 93; the switch 62 will be opened once more. However, switch 60 will remain closed by reason of the holding circuit that is completed over the wire 71, the switch 72 and the wire 73, as soon as the coil 102 of the relay 76 is energized.

It will be observed that the current drawn by the motor 56 passes through the resistor 79 and consequently creates a voltage drop thereacross. Such voltage drop is in direct relationship to the current being drawn by the motor 56. The signal created by this voltage drop is stepped up by the transformer 80 and applied from secondary winding 82 to the potentiometer 83. From the output of the potentiometer, a predetermined percentage of the input thereto is carried over the circuit connection from the slider 92 to the pair of Zener diodes 93.

By choosing the Zener diodes with proper characteristics, the amplitude of the voltage applied to these diodes that will pass current freely therethrough may be predetermined. Therefore, by proper adjustment of the various circuit constants, only when the power drawn by the motor 56 exceeds a predetermined amplitude will there be current flow over the circuit including the Zener diodes 93 and the coil 102 of the relay 76. Such predetermined power amplitude will be chosen to exceed somewhat the maximum amplitude during pumped-off conditions on the downstroke. Consequently, when the well is pumping normally and fluid is being drawn into the pump on the upstroke to support the weight of the fluid column on the downstroke, making it necessary for the motor to lift the counterweight (so that the power required by the motor 56 will be substantially the same for both up and down stroke—see FIGURE 2) the amplitude of the voltage applied from potentiometer 83 will exceed that set by the Zener diodes 93 during a portion of both of the up and down strokes. This means that charging current will be applied via the full wave rectifier (diodes 88, 89, 98 and 99) to the integrating circuit including capacitor 103, resistor 104, and the relay winding 102. Therefore, the relay 76 will be energized and contact 72 will be held down to close the holding circuit described above.

On the other hand, when the well becomes "pumped-off," this will create the special conditions just explained above. Thus, for each of the downstroke cycles, the amplitude of the voltage applied via potentiometer 83 to the circuit including Zener diodes 93 will be insufficient in amplitude to pass any signals through the diodes. Therefore, there will be current flow in the integration circuit only during the upstroke cycles and this will not be sufficient to keep relay 76 energized. Consequently, the contact 72 of relay 76 will drop to the open position, i.e., that illustrated in FIGURE 1. This will open the holding circuit for switch 60 so that it in turn will be released to open the contacts 59 which will in turn de-energize the motor 56.

Thus the motor will be stopped as soon as the well becomes pumped-off and will remain shut down until such time as the starting switch 62 is again closed. Such a restart may of course be arranged to take place automatically under a timing arrangement (not shown) if desired, or it may be left for manual reclosing upon a determination that the well which has become pumped-off is ready for pumping once more.

Figure 4:
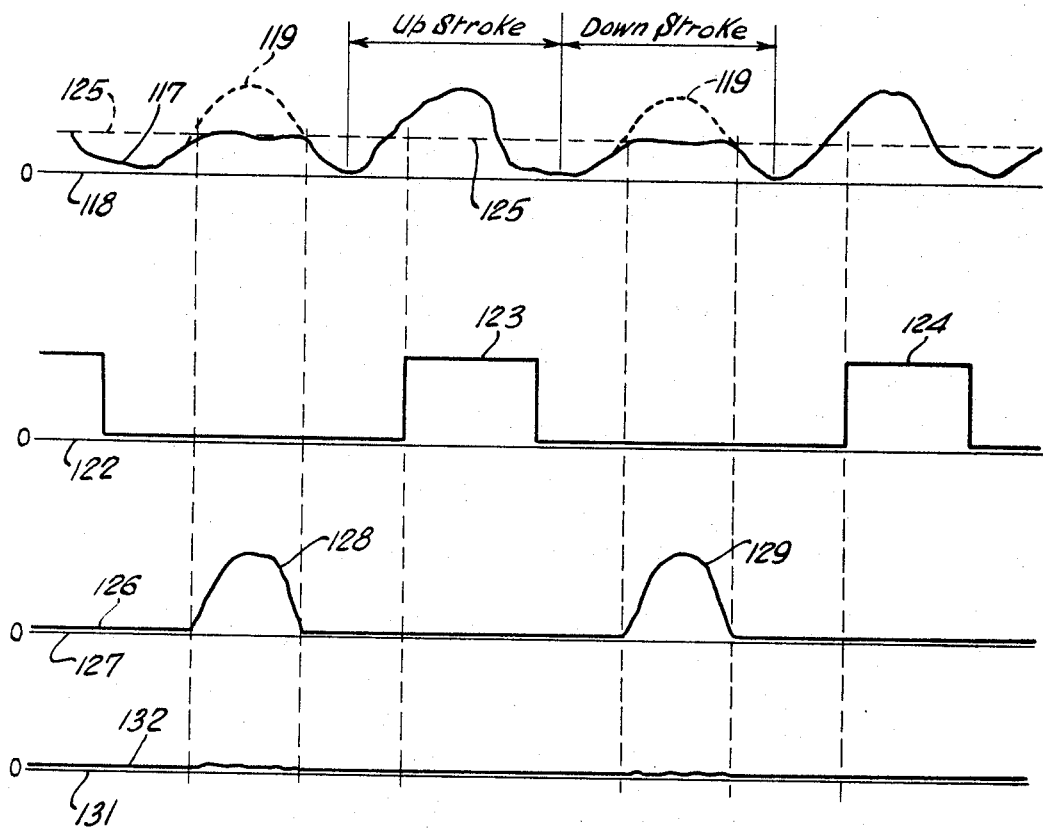
FIGURE 4 is a group of time diagrams illustrating conditions that are described, relative to a modified system according to the invention.

FIGURE 4 illustrates conditions under a modified arrangement of the system in accordance with the invention. This will provide increased sensitivity by cutting out, or eliminating the effects of the upstroke, during each complete pumping cycle.

Figure 6:
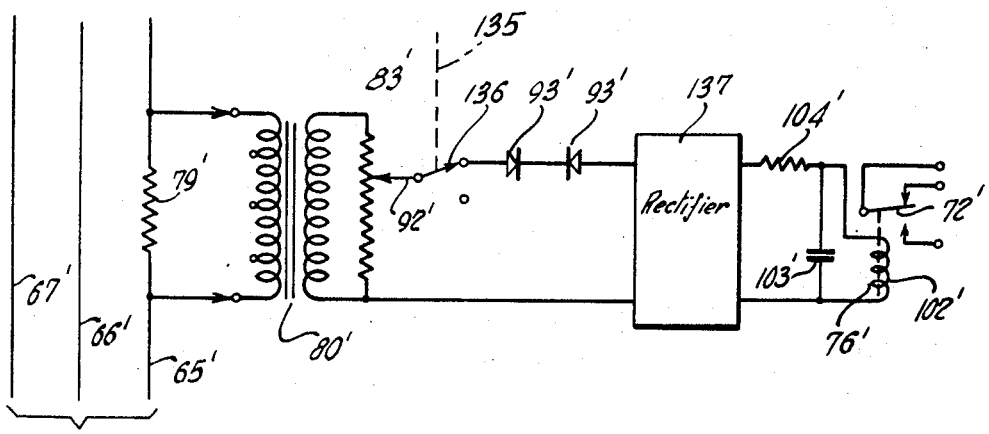
FIGURE 6 is an electrical circuit diagram illustrating a modified arrangement such that the sensitivity of the system may be increased.

One illustration of particular structure that may be employed to provide the increased sensitivity is shown in FIGURE 6. Thus, first with reference to FIGURE 4, the top line illustrates conditions of instantaneous power for both normal pumping and for pumped-off state. A solid line curve 117 shows the state of instantaneous power, with respect to a zero axis 118, under pumped-off conditions. And dashed line curves 119 show how the instantaneous power would differ during the downstroke portions of the cycles under normal pumping conditions. This illustrates the fact that substantially all the change takes place during the downstrokes only, and it is this fact that is the basis for the modified arrangement.

The second graph from the top, on the FIGURE 4 set of time correlated graphs, shows square wave pulses illustrating the output of a timer or multivibrator or the like, taken about an abscissa or zero axis 122. In this instance, a pair of pulses 123 and 124 are generated under control of a signal caused by the rise of the power on each upstroke above the predetermined amplitude as set by the Zener diodes and as described above. These pulses last for a time period sufficient to cover the whole upstroke portion that exceeds the predetermined power amplitude.

The leading edge of each of these pulses 123 and 124 is shown as occurring considerably after the point where the curve 117 has risen above the predetermined amplitude level (dashed line 125). But this is exaggerated greatly when time scale shown with FIGURE 2 is considered, because with electronic triggering it would be practically simultaneous. Of course, if these pulses are generated by an independently controlled timer, or the effect is gained by a timed switch as shown in FIGURE 6, the pulse could be commenced somewhat before the earliest time when the curve 117 would rise above the level 125 for each upstroke period.

The pulses 123 and 124 represent the time during which, under the modified arrangement of the system, signals are cut out and will not affect the relay 76. With this arrangement the contrast between normal pumping and pumped-off conditions will be substantially increased since it will be on the order of one hundred percent change rather than about fifty percent, as is the case where the upstroke power portions are not removed. This is clearly shown by the lower two curves in the set of curves shown in FIGURE 4.

Thus in the next to bottom curve of FIGURE 4, there is shown a curve 126 in relation to an abscissa or zero axis 127 which includes a set of humps 128 and 129. This illustrates the voltage exceeding the predetermined level, e.g. level 125, under normal pumping conditions and when the modified arrangement is employed. On the other hand, where the well is pumped-off, conditions will be according to a voltage curve 132 in the bottom graph that is shown in relation to a zero axis or abscissa 131. Here the voltage does not substantially exceed the predetermined level throughout.

*FIGURE 6 operation*

As indicated above, one manner of obtaining the increased contrast between normal pumping and pumped-off conditions, is that employing a time controlled switching arrangement such as is illustrated by FIGURE 6. In FIGURE 6, elements which correspond with those shown in FIGURE 1 have corresponding reference numerals but with a prime mark thereon. Therefore no detailed explanation concerning these elements need be given.

The timing arrangement for eliminating any voltage signals in the system during the upstroke portion of each pumping cycle is carried out by having mechanical connection 135 so arranged as to cause a switch 136 to be opened during that portion of each upstroke indicated by the square wave pulses 123 and 124 of FIGURE 4. Consequently, the passage of current from signals created by the voltage drop across resistor 79' will be eliminated during the upstrokes. It will be noted however, that the switch 136 is closed during the remaining portions of the pumping cycles so that during each of the downstrokes the signals from potentiometer 83' may always pass via Zener diodes 93', whenever the amplitude exceeds the predetermined level. Therefore, under normal pumping conditions signals will pass during each downstroke (corresponding with the humps 128 and 129) and will affect the relay 76' by energizing the coil 102' which in turn will hold the switch contacts 72' closed. As previously indicated, this arrangement tends to provide greater contrast between conditions of normal pumping and pumped-off state so that there will be increased sensitivity for causing the desired shut down upon pumped-off conditions.

Figure 5:
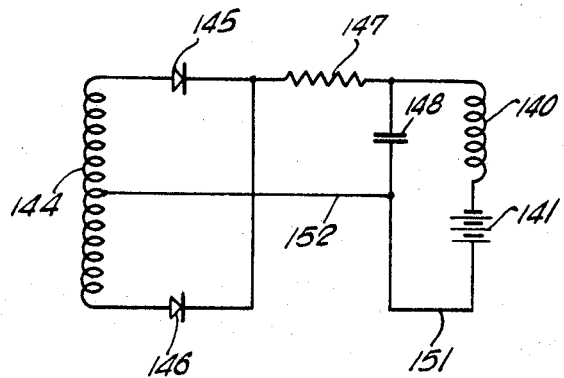
FIGURE 5 is an electrical circuit diagram illustrating a modification of that portion of the electrical system which surpresses the signals that are below a predetermined amplitude.

FIGURE 5 illustrates an alternative or a modification with respect to the element in the system that determines the amplitude level at which signals will pass to energize the holding relay. Thus, instead of employing a pair of Zener diodes 93 either in the system illustrated in FIGURE 1 or in FIGURE 6, the same "skimming" effect may be gained by providing a DC bias in series with the relay winding. In this manner, a relay winding 140 that corresponds with winding 102 of relay 76, has a DC battery 141 connected in series therewith with the polarity such as to oppose the DC current flow which will tend to exist in the winding 140 from the power signal. The amplitude of the voltage supplied by battery 141 will be equivalent to the voltage level design of the Zener diodes in the FIGURE 1 system. In other words, the amplitude level is thus set for passage of DC current through the winding 140 only when the amplitude of the voltage signals proportional to the instantaneous current (i.e., because of the voltage drop across the resistor 79 in the power supply line 65 of the motor 56) exceeds the voltage of the battery 141.

Consequently, it will be appreciated that the FIGURE 5 elements may be adapted to the FIGURE 1 system. Such adaptation will include a winding 144 which corresponds to the secondary winding 82 of the FIGURE 1 system. The output voltage from winding 144 is applied via a full wave rectifier circuit illustrated which includes a pair of diodes 145 and 146. The remainder of the rectifier circuit includes, of course, a resistor 147 that is connected to one side of a capacitor 148 and to one end of the relay winding 140. The circuit is completed from the other end of winding 140, via the bias battery 141, through circuit connections 151 and 152 to the center tap for winding 144. With this modification, there will be no current flow through the winding 140 of the relay, so long as the amplitude of the voltage signals produced from winding 144 fails to exceed the voltage of the bias battery 141. This will be true since no current flow is permitted due to the E.M.F. of bias battery 141 by reason of the polarities of diodes 145 and 146 which are arranged to prevent any such current flow.

It will be appreciated that other arrangements might be provided in place of the mechanical timing system illustrated in FIGURE 6. Thus, a multivibrator (not shown) might be connected so as to be triggered during the upstrokes whenever the predetermined signal amplitude is exceeded. The time duration would be adjusted to last until after this signal amplitude would always have fallen below the predetermined amplitude gain, in accordance with the square wave pulses 123 and 124 illustrated in FIGURE 4. The multivibrator pulses would be employed to control a gate (not shown) to create the same effect as the mechanical timing arrangement which actuates switch 136 in accordance with the FIGURE 6 illustration.

Similarly, it will be appreciated that, if desired, a half-wave rectifier system (not shown) similar to that illustrated and described in connection with FIGURE 5, might be employed instead of the full-wave rectifier there shown.

While particular embodiments of the invention have been described above in considerable detail in accordance with the applicable statutes, this is not to be taken as in any way limiting the invention but merely as being descriptive thereof.

I claim:

1. In combination with a beam type pumping unit having an electric motor for driving said unit, a first control circuit for shutting down said motor under pump-off conditions, said first control circuit comprising
    a power supply circuit for connecting a source of electric energy to said motor,
    a switch connected in said power supply circuit for disconnecting said motor from said source of electric energy,
    a relay for controlling actuation of said switch,
    an impedance in said power supply circuit for carrying motor load current therethrough,
    a transformer having an input connected to said impedance and an output, and
    a second control circuit for said relay comprising a pair of Zener diodes for blocking signal passage below a predetermined amplitude,
    a rectifier for providing direct current signals to said relay,
    a capacitor connected across said relay for integrating the signals that pass said Zener diodes, and
    circuit means for connecting said transformer output to said relay in order to control actuation thereof by deenergization whenever said pumping unit has pumped-off for a predetermined number of cycles.

2. In a reciprocating type pumping unit for pumping fluid from a well, an electric motor control system comprising
    an alternating current motor,
    circuit means for connecting said motor to a source of alternating electric power supply including a switch,
    means for measuring the amplitude of current drawn by said motor,
    means for integrating said measured amplitude only when it exceeds a predetermined level,
    said integrating means including a rectifier, a direct current relay winding, and a capacitor, and
    circuit means for connecting said relay output to control said switch,
    all whereby a loss of load on a predetermined number of strokes of said pumping unit will cause said relay to be actuated to open said switch and disconnect the motor from said source.

3. In a reciprocating type pumping unit for pumping fluid from a well, an electric motor control system according to claim 2 wherein said integrating means further includes a pair of Zener diodes.

4. In a reciprocating type pumping unit for pumping fluid from a well, an electric motor control system according to claim 2 wherein said integrating means further includes a DC bias voltage in series with said relay winding.

5. In a reciprocating type pumping unit for pumping fluid from a well, an electric motor control system according to claim 2 comprising in addition
    means for eliminating measurement of said current during each upstroke of said pumping unit.

References Cited

UNITED STATES PATENTS

| | | | |
|---|---|---|---|
| 2,947,931 | 8/1960 | Hubby | 318—447 |
| 3,078,392 | 2/1963 | Bollesen | 318—447 X |
| 3,167,686 | 1/1965 | Riebs. | |
| 3,214,641 | 10/1965 | Sonnemann. | |
| 3,283,236 | 11/1966 | Legg | 318—447 |
| 3,324,355 | 6/1967 | Gessner et al. | |

ORIS L. RADER, *Primary Examiner.*

B. A. COOPER, *Assistant Examiner.*